US006459744B1

United States Patent
Helard et al.

(10) Patent No.: US 6,459,744 B1
(45) Date of Patent: Oct. 1, 2002

(54) MULTI-CARRIER SYMBOL SYNCHRONIZATION

(75) Inventors: Jean-Francois Helard; Pierre Combelles; Damien Castelain, all of Rennes (FR)

(73) Assignee: France Telecom, Telediffusion de France, Paris (FR)

( * ) Notice: Subject to any disclaimer, the term of this patent is extended or adjusted under 35 U.S.C. 154(b) by 0 days.

(21) Appl. No.: 09/101,881
(22) PCT Filed: Jan. 17, 1997
(86) PCT No.: PCT/FR97/00099
  § 371 (c)(1),
  (2), (4) Date: Nov. 3, 1998
(87) PCT Pub. No.: WO97/26742
  PCT Pub. Date: Jul. 24, 1997

(30) Foreign Application Priority Data

Jan. 18, 1996 (FR) .............................................. 96 00766

(51) Int. Cl.$^7$ ................................................ H04L 7/00
(52) U.S. Cl. ...................................................... 375/354
(58) Field of Search .................................. 375/354, 224, 375/362, 377, 262

(56) References Cited

U.S. PATENT DOCUMENTS 5,228,025 A * 7/1993 Le Floch et al. ............ 370/206
5,450,456 A * 9/1995 Mueller ....................... 375/224

\* cited by examiner

Primary Examiner—Chi Pham
Assistant Examiner—Kevin M Burd
(74) Attorney, Agent, or Firm—Kinney & Lange, P.A.

(57) ABSTRACT

A method for the time synchronization of a multi-carrier signal receiver consisting of a sequence of symbols each formed by a plurality of carrier frequencies. Each carrier frequency is modulated by a modulation coefficient. The position of some of said carrier frequencies in the time-frequency space is known to the receiver, and said frequencies are reference carrier frequencies. Each reference carrier frequency bears a reference coefficient with a value that is known to the receiver. The method includes a fine synchronization step, wherein the signal transmission channel impulse response is estimated on the basis of reference coefficients belonging to at least two received symbols. The beginning of the useful portion of each of the symbols is determined, and/or a receiver clock is controlled by analyzing the estimate of said impulse response.

20 Claims, 4 Drawing Sheets

MULTI-CARRIER SYMBOL SYNCHRONIZATION

BACKGROUND OF THE INVENTION

The field of the invention is that of the transmission of multicarrier digital signals, that is to say signals implementing a plurality of multicarriers transmitted simultaneously and modulated each by distinct data elements. More specifically, the invention relates to the time synchronization of receivers of such signals.

Multicarrier signals are generally called frequency division multiplex (FDM) signals. A particular example of these signals to which the invention can be applied in particular is that of OFDM (orthogonal frequency division multiplex) signals.

An OFDM signal is used for example in the digital broadcasting system described especially in the French patent FR 86 06922 filed on Jul. 2, 1986 and in M. Alard and R. Lassalle, *Principes de modulation et de codage canal en radiodiffusion numérique vers les mobiles* ("Principles of modulation and channel encoding in digital radio broadcasting towards mobile units"), Revue de l'UER, No. 224, August 1986, pp. 168–190, known as the COFDM (coded orthogonal frequency division multiplex) system.

This COFDM system has been developed in the context of the European DAB (digital audio broadcasting) project. It is also being put forward for standardization for the terrestrial broadcasting of digital television (the DVB-T standard in particular). More generally, the COFDM system can be used to transmit any type of digital signals (or analog signals that are sampled but not necessarily quantified).

This system is based on the joint use of a channel encoding device and an orthogonal frequency division multiplex method of modulation. This system is particularly suited to the broadcasting of digital signals at a high bit rate (some megabits per second) in channels that are assigned multiple paths whose characteristics vary in time (for example in the case of mobile reception in an urban environment).

The modulation method proper makes it possible to overcome problems related to the frequency selectivity of the channel. It consists in redistributing the information to be transmitted over a large number of carriers juxtaposed and modulated at a low bit rate. A system for the interlacing of information to be transmitted is associated with the encoding method in such a way that the maximum statistical independence of the samples is ensured at the input of the decoder.

The time synchronization of a COFDM receiver consists of the determining, in the frame of the OFDM signal received, of the location of the useful part of each symbol (constituted by a guard interval and a useful part) for the application thereto of the FFT window enabling the selection of the useful part of each symbol. This information of time synchronization is also used for the feedback control of the clock of the receiver in order to implement the rate recovery device.

This time synchronization function of the receiver can be generally subdivided into a rough time synchronization (during the acquisition period) and a fine time synchronization.

According to a known technique, implemented especially in the DAB digital broadcasting program, the time synchronization can be based on special symbols designed for this purpose, generally placed at the beginning of a frame.

In this case, each frame advantageously starts with at least two special symbols, S1 and S2, used for the synchronization. It then comprises a certain number of useful symbols, each comprising a plurality of modulated orthogonal carriers.

The symbol S1 is a zero symbol enabling firstly the performance of a rough synchronization. The symbol S2 is a second synchronization symbol formed by a non-modulated multiplex of all the carrier frequencies with a substantially constant envelope. This enables a more precise recomputation of the synchronization by analysis of the pulse response of the channel. The role and the mode of preparing these symbols S1 and S2 are described in the patent FR 88 15216 filed on Nov. 18, 1988 on behalf of the present Applicants.

The symbol S2 is also known as the CAZAC symbol and the TFPC symbol in other embodiments.

The idea is now being envisaged of producing COFDM signals that do not have such special symbols dedicated to time synchronization. This is especially the case with digital television signals under standardization.

Other synchronization methods should therefore be developed. Thus, there is a known technique, called the guard interval correlation technique which enables the performance of a rough synchronization.

The guard interval of an OFDM symbol consists of the repetition of the samples of the end of said OFDM symbol. The method consists of the computation of the correlation between the samples constituting the guard interval and the samples of the end of the symbol in order to extract a correlation "peak" therefrom.

After temporal filtering, this correlation "peak" can then be used as a synchronization pulse to determine the length of the OFDM symbol and of the guard interval $\Delta$, and hence the beginning of the FFT window. This operation is performed before the demodulation FFT on the COFDM signal received in the temporal domain.

If x(t) designates the COFDM signal received in the temporal domain, the measurement of the correlation at the instant $t=T_n$ can be given by the following expression:

$$\Gamma_x(T_n) = \sum_{t=T_n}^{T_n+T_i} |x(t) \cdot x^*(t-t_s)|$$

where * signifies the "conjugate" of a complete number and | | signifies "the modulus" of a complex number.

The measurement of the correlation is done on blocks with a length $T_i$ equal to or smaller than the length of the guard interval $\Delta$. Should the receiver not have a priori knowledge of the length of the guard interval (there are provided, in certain systems, variable sizes depending on the application), the measurement of the correlation may be done at the outset on blocks of a length equal to the minimum length of the guard interval.

Under ideal conditions where there is no noise, no multiple paths and no co-channel interference, the correlation "peak" (or "pulse") obtained may be exploited to generate the "rough" time synchronization.

For example, FIG. 1 shows the measurement of the correlation obtained after temporal filtering in the case of a noise-affected ideal transmission (11) and a noiseless ideal transmission (12) with a pulse response h(t) 13 of the channel with only one path 14.

This information can also be used for the fine time synchronization: by measuring the distance 15 between two successive correlation "peaks", it is possible to deduce the length $T_s=T_u+\Delta$ of an OFDM symbol and therefore the length of the guard interval $\Delta$.

By contrast, in the presence of major echoes or a high level of interference, the correlation peak obtained is highly deformed and is more or less spread as a function of the spread of the echoes.

FIG. 2 shows the measurement of the correlation obtained after temporal filtering in the case of a noise-affected transmission (21) and a noiseless transmission (22) which however is characterized by a pulse response h(t) 23 of the channel having two paths $24_1$ and $24_2$ spaced out by the length of the guard interval $\Delta$ and received with identical power.

The correlation peak 25 may then be exploited to determine the length of an OFDM symbol and generate the rough time synchronization but its precision is insufficient for the deduction therefrom of a fine temporal synchronization.

Indeed, when the reception conditions evolve in time, which is the case in portable and mobile reception, the form of the measurement of the correlation of the guard interval is highly fluctuating. A fine time synchronization generated solely from this information, even if this information is temporally filtered, will then be affected by a substantial amount of jitter.

Furthermore, the measurement of the correlation of the guard interval will be greatly polluted in the presence of intersymbol interference due to the presence of echoes.

SUMMARY OF THE INVENTION

An aim of the invention in particular is to overcome these drawbacks of the prior art.

More specifically, an object of the invention is to provide a method and device of time synchronization for multicarrier signal receivers that do not require the transmission of synchronization symbols specific to this function.

In particular, an aim of the invention is to provide a method of this kind and a device of this kind compatible with the signal structure presently proposed for terrestrial broadcasting of digital television.

Another aim of the invention is to provide a method and device of this kind that makes it possible to to obtain a fine synchronization of high quality, even in the presence of a received signal that is highly disturbed. In particular, it is an aim of the invention to enable accurate operation in the presence of echoes that are long and possibly lengthier than the duration of the guard interval.

Yet another aim of the invention is to provide a method and device of this kind that can easily be implemented in any type of receiver with limited technical complexity and cost price.

These goals as well as others that shall appear hereinafter are achieved according to the invention by a method for the time synchronization of a receiver of a multicarrier signal consisting of a sequence of symbols each formed by a plurality of carrier frequencies each modulated by a modulation coefficient, certain of said carrier frequencies, with a position in the time-frequency space that is known to said receiver, being reference carrier frequencies bearing a reference coefficient with a value known to said receiver, said method comprising a fine synchronization phase comprising the following steps:

the estimation of the pulse response $\hat{h}_n$ of the transmission channel of said signal on the basis of reference coefficients belonging to at least two received symbols;

the determination of the beginning of the useful part of each of said symbols and/or the feedback control of a clock of the receiver by the analysis of said estimation of the pulse response $\hat{h}_n$.

In other words, the invention proposes the creation of a fictitious time synchronization symbol, in bringing together several reference elements belonging to several symbols. The fictitious symbol thus obtained is used to determine an estimation of the pulse response and deduce a fine synchronization therefrom.

This technique is quite novel and inventive for those skilled in the art who have always felt that it is necessary for at least one particular synchronization symbol to be transmitted to determine an estimation of the pulse response.

Furthermore, it requires adaptations that are not obvious, presented here below when, as is generally the case, the pulse response obtained according to the invention is sub-sampled.

Advantageously, said step for the estimation of the pulse response $\hat{h}_n$ comprises the following steps:

the extraction of the reference coefficients belonging to M symbols comprising successive reference carriers, said reference carriers being separated by L useful carriers in one and the same symbol and being offset by R carriers between two symbols comprising successive reference carriers, with M and L greater than or equal to 2 and $R=(L+1)/M$;

the grouping together of said extracted reference coefficients so as to form a fictitious synchronization symbol, sub-sampled by a factor R;

the reverse Fourier transform of said fictitious synchronization symbol so as to obtain an estimation of the pulse response $\hat{h}_n$ extending over a duration $t_s/R$, $t_s$ being the useful period of a symbol.

This distribution of the reference carriers (in a quincunxial arrangement) is of course only one example, and many other forms of distribution can be envisaged. If there is no other possibility, the reference carriers of only one symbol may be used but in this case the pulse response is highly sub-sampled.

As mentioned here above, in certain situations, the sub-sampling introduces uncertainties with regard to the synchronization correction to be made (in advance or delayed). To overcome this problem, said analysis of the estimation of the pulse response $\hat{h}_n$ advantageously comprises the following steps:

the search for a pulse representing the first path of the signal in the transmission channel;

the analysis of said pulse representing the first path so as to determine if it is an echo or a pre-echo, and said step for the determination of the start of the useful part of each of said symbols checks the position of a temporal selection window on the received signal, so as to position said pulse representing the first path substantially at the instant t=0 in said estimation of the pulse response $\hat{h}_n$, said window having to be delayed if it is an echo and advanced if it is a pre-echo.

Preferably, in this case, the time range $[0, t_{max}]$ on which said estimation of the pulse response $\hat{h}_n$ extends is divided into two fields:

a first field, called a field in advance, extending from the instant 0 to an instant $t_{lim}$, and a second field, called a delayed field, extending from the instant $t_{lim}$ to the instant $t_{max}$, said pulse representing the first path being considered to be an echo if it is in said field in advance and a pre-echo if it is in said delayed field.

$t_{lim}$ may be chosen for example to be greater than or equal to the duration $\Delta$ of the guard interval preceding the useful part of each of said symbols.

Preferably, the method of the invention also comprises a rough synchronization phase implemented in parallel to said fine synchronization phase, and comprising a step for the correlation of the guard interval (known per se and described in the introduction) consisting of a search for a correlation peak between the contents of a guard interval preceding the useful part of each of said symbols and the end of the useful part of said symbol so as to determine the duration of said symbol.

Apart from the rough synchronization, the correlation of the guard interval may be used in a novel fashion to further improve the fine synchronization of the invention, in certain special cases.

Indeed, advantageously, the method then comprises a step for distinguishing between a long echo and a pre-echo, when said pulse representing the first path is in said delayed field, by analysis of the measurement of the correlation of the guard interval, consisting in determining the number of samples of said measurement of the correlation greater than a decision threshold, said pulse representing the first path being considered as a long echo when said number of samples is greater than a predetermined value.

This technique makes it possible to remove the uncertainty of certain borderline cases between a very long echo and a pre-echo.

Advantageously, said decision threshold is substantially proportional to the smallest amplitude of the two amplitudes corresponding to the highest pulse of each of said fields that are 'in advance' or 'delayed'.

The invention also relates to the devices implementing the method described here above. A time synchronization device of this kind for a receiver of a multicarrier signal comprises fine synchronization means comprising:

means for the estimation of the pulse response $\hat{h}_n$ of the transmission channel of said signal on the basis of reference coefficients belonging to at least two received symbols;

means to determine the beginning of the useful part of each of said symbols by the analysis of said estimation of the pulse response $\hat{h}_n$.

BRIEF DESCRIPTION OF THE DRAWINGS

Other features and advantages of the invention shall appear from the following description of a preferred embodiment of the invention, given as a simple illustrative and non-restricted example, and from the appended drawings, of which.

DETAILED DESCRIPTION

Figure 1:
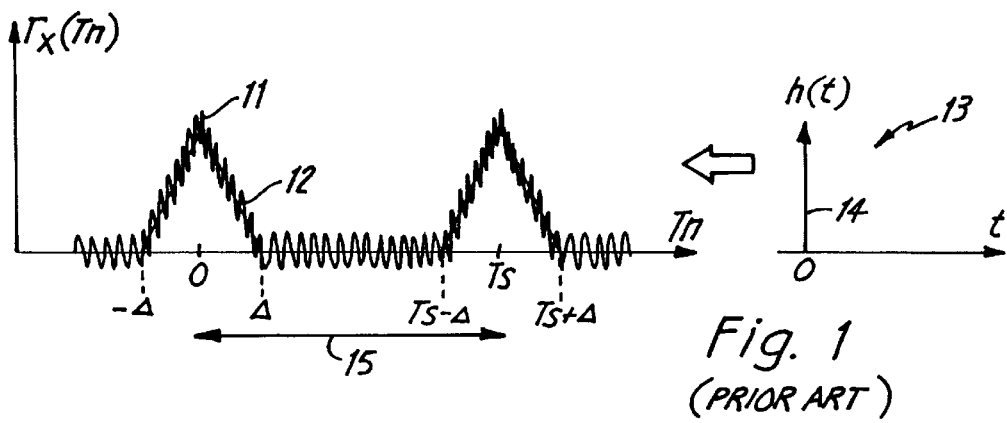
FIGS. 1 and 2 illustrate the principle of the prior art technique of rough synchronization by correlation of the guard interval, already commented upon in the introduction, where the pulse response of the transmission channel has respectively a single path and two paths.

The invention applies to the acquisition of the time synchronization in the receivers of COFDM signals that do not include dedicated synchronization symbols. The preferred embodiment described here above can be applied especially to receivers of digital television signals according to the DVB-T standard.

Before providing a detailed description of the invention, we shall briefly recall the main characteristics of the transmitted signal.

The transmitted signal consists of a sequence of modulation symbols forming a multiplex of N orthogonal carriers.

Let $\{f_k\}$ be the set of carrier frequencies considered with:

$f_k = k/ts,\ k=0\ \text{to}\ N-1$ where ts represents the duration allotted to a modulation signal.

A base of elementary signals is then defined:

$\psi_{j,k}(t)$ with $k=0$ to $N-1$, $j=-\infty$ to $+\infty$;

$\psi_{j,k}(t) = g_k(t - jt_s)$ with:

$0 \leq t < t_s$: $gk(t) = e^{2i\pi f_k t}$ elsewhere: $gk(t) = 0$

Let us then take a set of complex numbers $\{C_{j,k}\}$ taking its values in a finite alphabet.

The associated OFDM signal is written as follows:

$$x(t) = Re\left[e^{2i\pi f0}\left(\sum_{j=-\infty}^{+\infty}\sum_{k=0}^{N-1} C_{j,k} \cdot \Psi_{j,k}(t)\right)\right]$$

where f0 is the carrier frequency of the COFDM multiplex.

To overcome any problems of frequency selectivity of the channel, a guard interval with the duration $\Delta$ is inserted before each signal $\psi_{j,k}(t)$ in order to absorb the intersymbol scrambling.

ts henceforth represents the duration of the useful signal, $\Delta$ the duration of the guard interval and $T_s = ts + \Delta$ the duration of the symbol.

The signals transmitted are then defined by the relationship:

$\psi_{j,k}(t) = g_k(t - jT_s)$ with $-\Delta \leq t < t_s$: $gk(t) = e^{2i\pi f_k t}$ elsewhere: $gk(t) = 0$.

The channel is modelled by the relationship:

$Y_{j,k} = H_{j,k} C_{j,k} + N_{j,k}$ where:

$H_{j,k}$ is the complex response of the channel at the frequency $f_k$ and at the instant jTs, $N_{j,k}$ is a complex Gaussian noise, $Y_{j,k}$ is the symbol obtained after projection of the COFDM signal received at each carrier k and at each instant j.

The pair (j,k) defines what is called a cell, namely a carrier (k) during a symbol time (j).

In reception, to implement the coherent demodulation of the OFDM multiplex, it is necessary to estimate the response of the channel in phase and in amplitude at any time and for all the frequencies of the multiplex. To this end, the COFDM signal comprises certain so-called reference carriers, carefully distributed in the time-frequency field.

This technique is described especially in the patent FR-90 01491 filed on behalf of the same Applicants as those of the present patent application.

The invention proposes to use these reference carriers also for another purpose, namely time synchronization.

During transmission, the channel can be modelled by the relationship:

$$Y_{j,k} = H_{j,k} C_{j,k} + N_{j,k}$$

where:

$H_{j,k}$ is the complex response of the channel at the frequency $f_k$ and at the instant jTs, $N_{j,k}$ is a complex Gaussian noise, $Y_{j,k}$ is the sample obtained for each carrier k and each instant jTs after the Fourier transform for the demodulation of the COFDM signal.

The carrier recovery device used in coherent demodulation must be capable of giving an estimation of the response of the channel:

$$H_{j,k} = \rho_{j,k} e e^{i\psi_{j,k}}$$

for all the symbols j and all the frequencies k.

For this purpose, the COFDM signal has certain reference carriers carefully distributed in the time-frequency domain, used as phase and amplitude reference pilot frequencies. From the samples $Y_{j,k}$ (obtained at output of the Fourier transform) and with the symbols $C_{j,k}$ that have modulated the reference carriers being known, it is possible to obtain an estimation of the quantities $H_{j,k}$ corresponding to said reference carriers in noting that:

$$H_{j,k} = Y_{j,k} \cdot \frac{C^*_{j,k}}{|C_{j,k}|^2}$$

Figure 3:
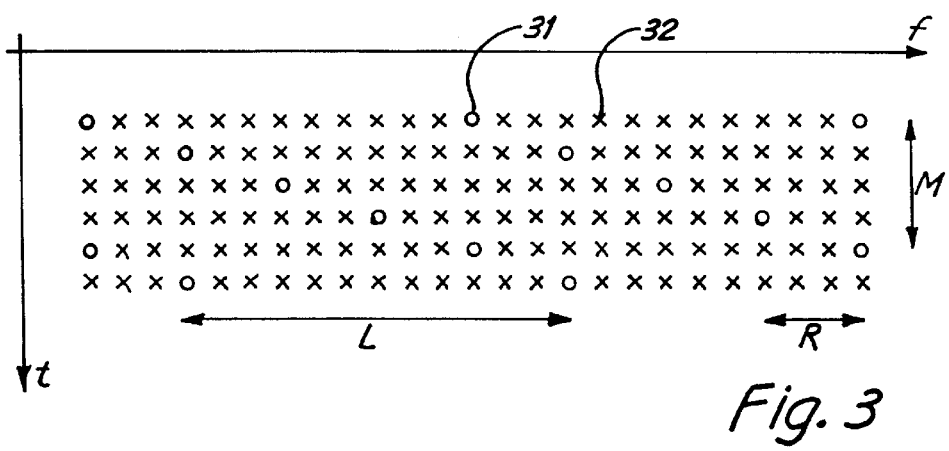
FIG. 3 shows an example of the distribution of reference carriers in the time-frequency space.

An exemplary distribution in the time-frequency space of the reference carriers arranged quincunxially is shown in FIG. 3.

In this figure, the reference pilot carriers 31 are represented by dots and the useful carriers 32 (bearing useful data) are represented by crosses.

In this example, it is noted that:

in one and the same symbol, two consecutive reference carriers are separated by L=11 useful carriers;

the first reference carrier of a given symbol is offset by R=3 carriers, with respect to the previous symbol (modulo 12);

consequently, the same pattern occurs every M=(L+1)/R=4 symbols.

By combining several OFDM symbols comprising reference carriers arranged quincunxially at a rate of one every R carriers, it is possible to form a fictitious symbol comprising N/R reference elements known to the receiver. It is then possible, as proposed according to the invention, to obtain a noise-affected estimate of the sub-sampled frequency response of the channel represented by:

$$H_k \text{ for } k=n.R, \ n: 0 \ldots (N/R)-1$$

For the case shown in FIG. 3, it can be ascertained that, by grouping M=4 consecutive symbols, an estimation is obtained of the N/3 quantities $H_k$ for k=3n, representing a frequency response of the channel sub-sampled in a ratio of 3.

It is then possible, from this estimation of the sub-sampled frequency response of the channel, to obtain an estimation of the pulse response $\hat{h}_n$ of the channel by applying a reverse discrete Fourier transform on N/R points. This estimation $\hat{h}_n$ of the pulse response of the channel, represented on N/R samples, has a horizontal of ts/R.

Figure 4:
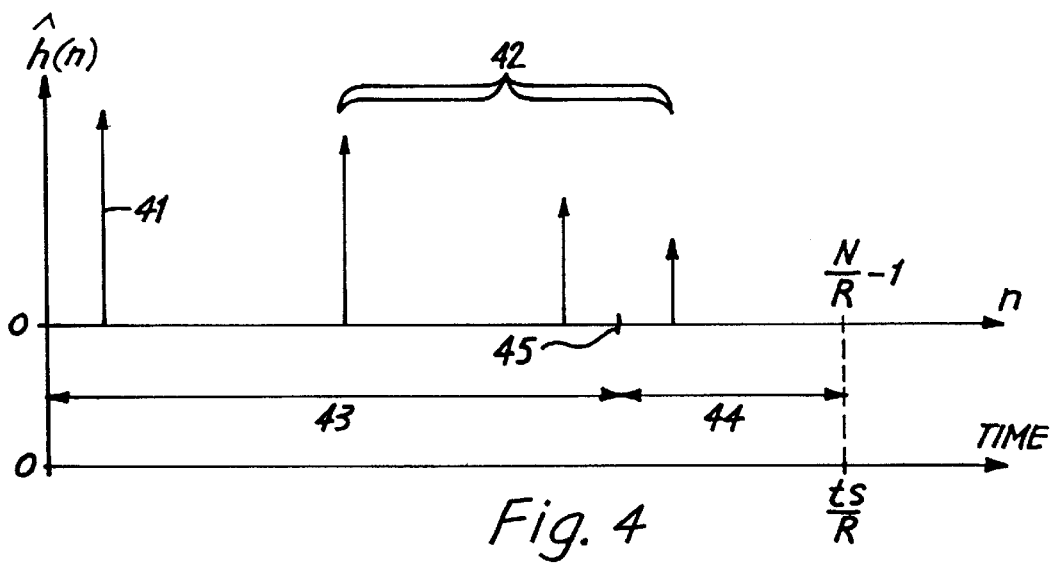
FIG. 4 illustrates an example of estimation of the pulse response of the transmission channel obtained from reference elements of FIG. 3 according to the method of the invention.

An example of an estimation of this kind is shown in FIG. 4. This estimation comprises (after threshold-setting) four peaks, a first peak 41 corresponding to the first path, or received path (direct trajectory in general) of the transmission channel and peaks 42 corresponding to the secondary trajectories of this channel.

The analysis of this response $\hat{h}_n$ makes it possible to determine the location of the useful part of each symbol in the frame of the received COFDM signal, in order to apply the FFT window thereto. A fine temporal synchronization is thus generated.

This analysis consists in determining which is the first pulse of the response $\hat{h}_n$ corresponding to the first path received that must be taken into account. This is done simply by comparing the amplitude of the different samples of the estimation of the response $\hat{h}_n$ with a threshold and then determining the first significant pulse corresponding to the first path received.

For this purpose, the horizon (equal to $t_s/R$) of the pulse response of the channel is divided into two fields (a field 'in advance' 43 and a 'delayed' field 44) to decide if the FFT window, from the viewpoint of the analysis, is in advance or delayed with respect to the ideal position.

For example, for the case shown in FIG. 3, the horizon of the estimation $\hat{h}_n$ of the pulse response is equal to $t_s/3$. If we consider that the maximum value of the guard interval $\Delta$ is equal to $t_s/4$, the boundary 45 demarcating the two fields could be chosen to be equal to $t_s/4$.

Figure 5A:
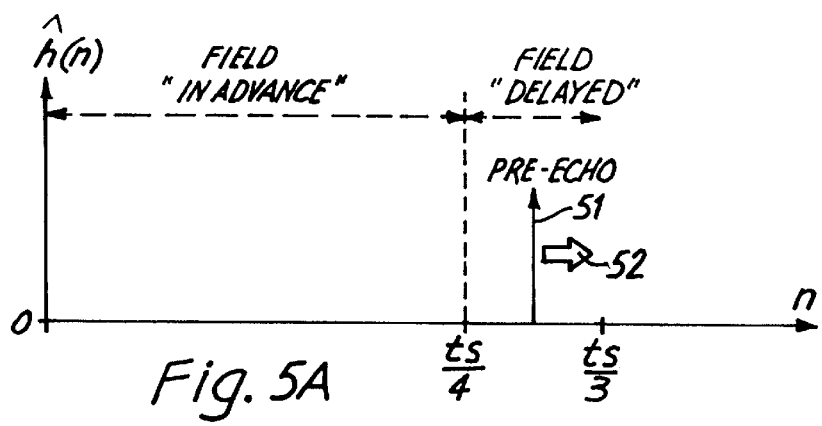
FIGS. 5A and 5B show two examples of estimation of the pulse response liable to be encountered according to the invention and corresponding respectively to a pre-echo and to an echo.

Thus, referring to FIG. 5A, this means that a pulse 51 with a value greater than the amplitude threshold located between $t_s/4$ and $t_s/3$ would be considered not as an echo but as a pre-echo. Since this pulse 51 corresponds to the first path received, it will be necessary to advance (52) the FFT window in order to "align it" on this first path.

Figure 5B:
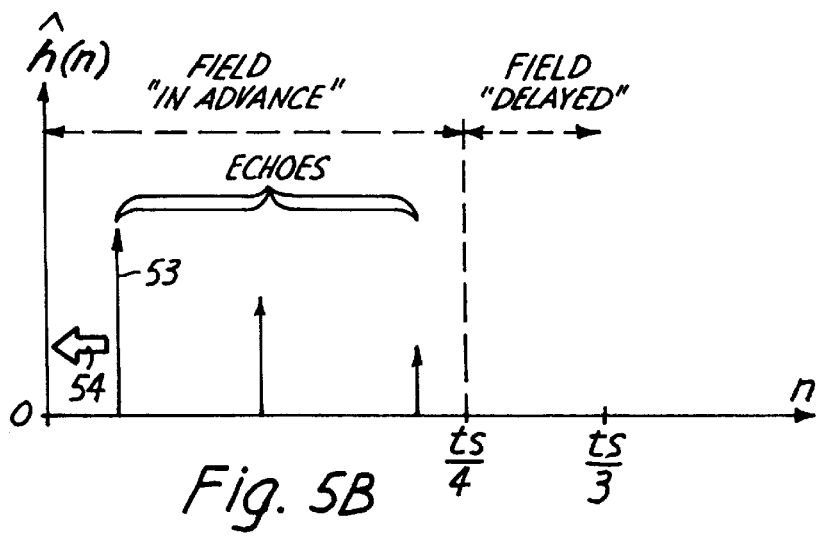

By contrast, if the first significant pulse 53, namely the pulse greater than the threshold, is located between 0 and $t_s/4$, it will be necessary to delay (54) the FFT window in order to align it on this first path, as illustrated in FIG. 5B.

The method of the invention using this analysis of the pulse response obtained from the pilot carriers is in many cases satisfactory for the generation of a fine time synchronization. However, in the presence of a very long echo, it has a drawback when it is used in isolation.

To describe this drawback, reference is made to the example of FIG. 3, characterized by a horizon of the pulse response equal to $t_s/3$, the boundary between the two fields, namely the field "in advance" and the "delayed" field, being located at $t_s/4$.

In the case of a lengthy echo with a delay greater than $t_s/4$ and smaller than $t_s/3$, the estimation $\hat{h}_n$ will have a pulse located between $t_s/4$ and $t_s/3$. This pulse will then be considered (see FIG. 5A) erroneously by the receiver not as an echo but as a pre-echo. The receiver will align the FFT window on what it believes to be the first path. This will cause great deterioration in the performance characteristics. The receiver will then be badly synchronized temporally.

To prevent this type of situation, it is proposed to simultaneously use the method of the invention and the already described method of correlation of the guard interval, which prove to be complementary.

The problem encountered with the method of the invention and described here above results from the fact that the receiver, in analyzing the pulse response, is incapable of distinguishing between a long echo (greater than the boundary between the two fields, namely the field "in advance" and the "delayed" field) and the pre-echo.

To remove this ambiguity, it is proposed to analyze the measurement of the correlation of the guard interval.

We have seen here above that the assessment of the distance between two successive "peaks" of the measurement of the correlation of the guard interval is used to determine the length $T_s=t_s+\Delta$ of an OFDM symbol and hence the length $\Delta$ of the guard interval.

Figure 2:
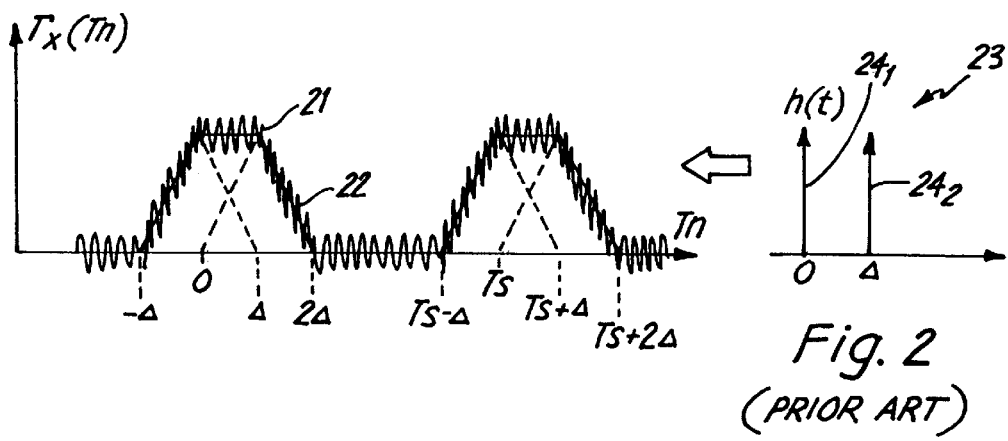

Furthermore, the spread of the measurement of this correlation depends directly on the spread of the paths. This is clearly revealed by the comparison of the two FIGS. 1 and 2 representing the measurement of the correlation obtained with respectively one and two paths spaced out by $\Delta$. It is therefore possible, by counting the number of samples that go beyond a given threshold, to assess the spread of the echoes and hence differentiate between a pre-echo and a long echo.

We shall again consider the example of the distribution of the reference carriers of FIG. 3 making it possible to obtain an estimate of the pulse response of the channel on a horizon of $t_s/3$.

Figure 6B:
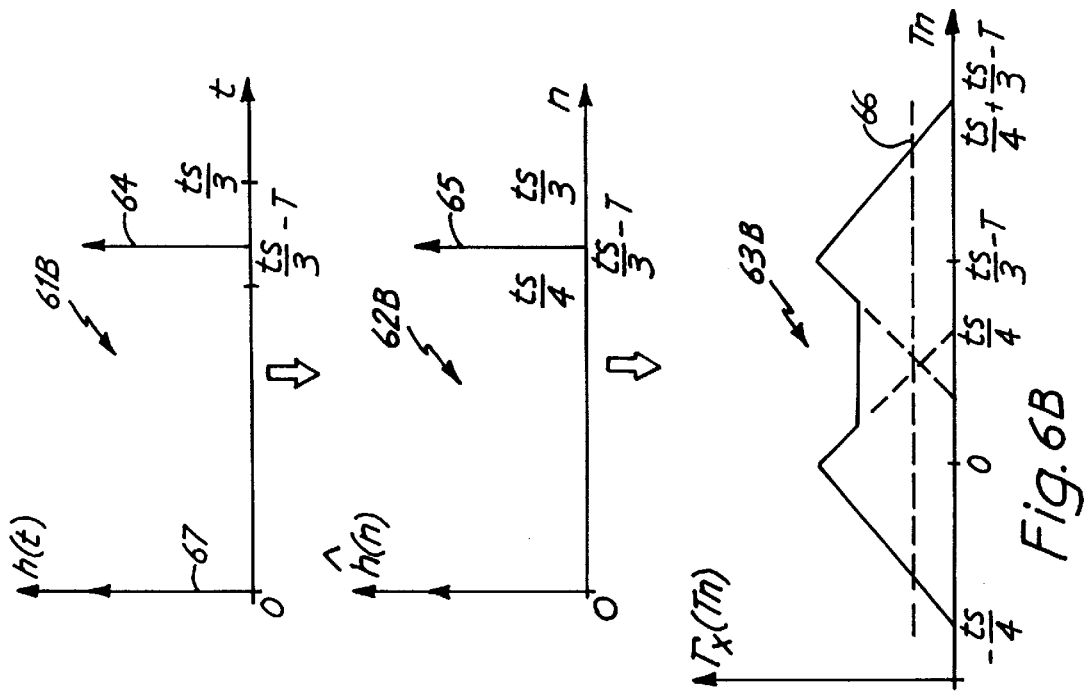
FIGS. 6A and 6B illustrate a method of differentiation between a pre-echo (FIG. 6A) and a long echo (FIG. 6B), by means of the measurement of the correlation of the guard interval.
Figure 6A:
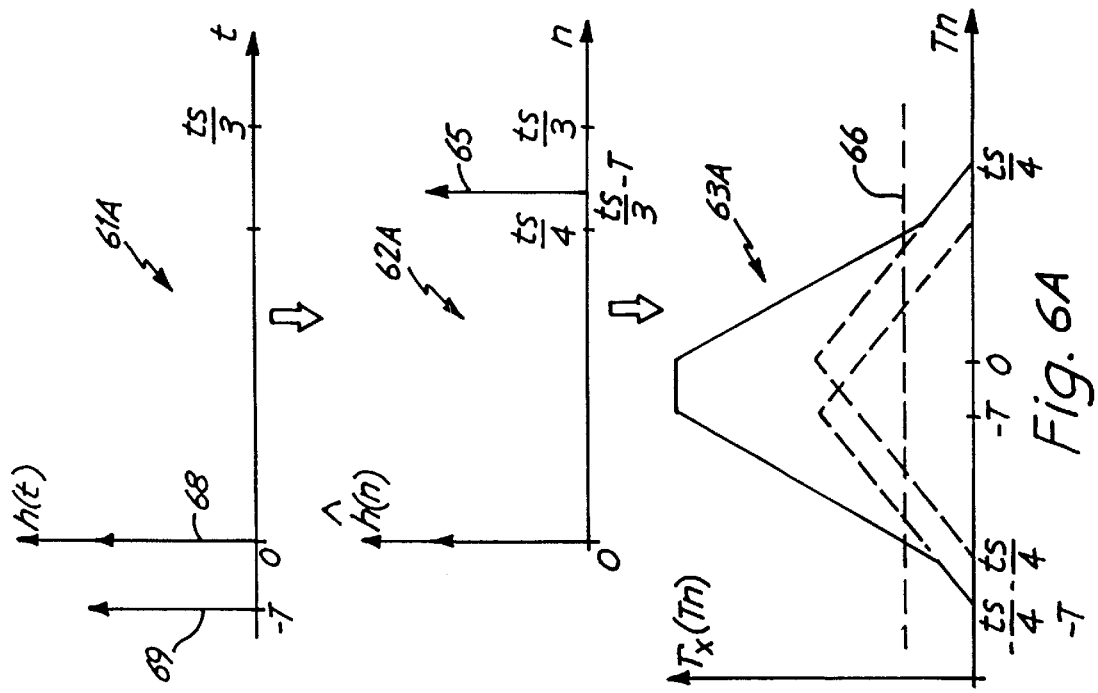

FIGS. 6A and 6B show the pulse response h(t) 61$_i$ of the channel, the estimation ĥ$_n$ 62$_i$ computed by the receiver of this response and the measurement of the correlation of the guard interval 63$_i$ for the following two cases:

FIG. 6A: appearance of a pre-echo 69 at −T, the receiver being initially well synchronized on the single path 68 existing at t=0; the two paths are received with identical power and the transmission is unaffected by noise;

FIG. 6B: the appearance of a long echo 64 with a delay $t_s/3$−T, the receiver being also initially well synchronized on the single path 67 existing at t=0; the two paths are received with identical power and the transmission is not affected by noise.

The measurement of the correlation of the guard interval is done on blocks with a length $T_i=t_s/4$. In both cases, the estimation ĥ$_n$ 62$_A$ and 62$_B$ computed by the receiver of the pulse response of the channel is identical with a peak 65 at $t_s/3$−T.

On the other hand, the measurement of the correlation of the guard interval is spread to a far greater extent (63$_B$) in the case of a long echo 64 than (63$_A$) in the case of the pre-echo 69.

By counting the number of samples of this measurement exceeding a given decision threshold 66 (or the ratio of the number of samples greater than this threshold to the number of samples below the threshold), it is possible to remove the ambiguity and differentiate between a pre-echo and a long echo.

The level of this decision threshold 66 can advantageously be fixed as follows. The goal is to distinguish in the "uncertainty" zone between a pre-echo and a long echo. In the case discussed here above, this zone of uncertainty is located between $t_s/4$ and $t_s/3$.

For this purpose, it is sought to assess the real temporal gap between two significant pulses located respectively in the first field 43 ('in advance') and in the second field 44 ('delayed' or again 'uncertainty zone').

It is possible in particular to assess the amplitude of the greatest pulse in each of the two fields 43 and 44. In order to be sure of taking account of the contributions of these two main paths, the level of the decision threshold can then be a function of the smallest amplitude of these two maximum pulses. Thus, when the maximum amplitude of the pulses located in the uncertainty zone is small, the decision level applied to the correlation of the guard interval will be lowered and it will be possible to distinguish between a pre-echo and a long echo without ambiguity.

Figure 7:
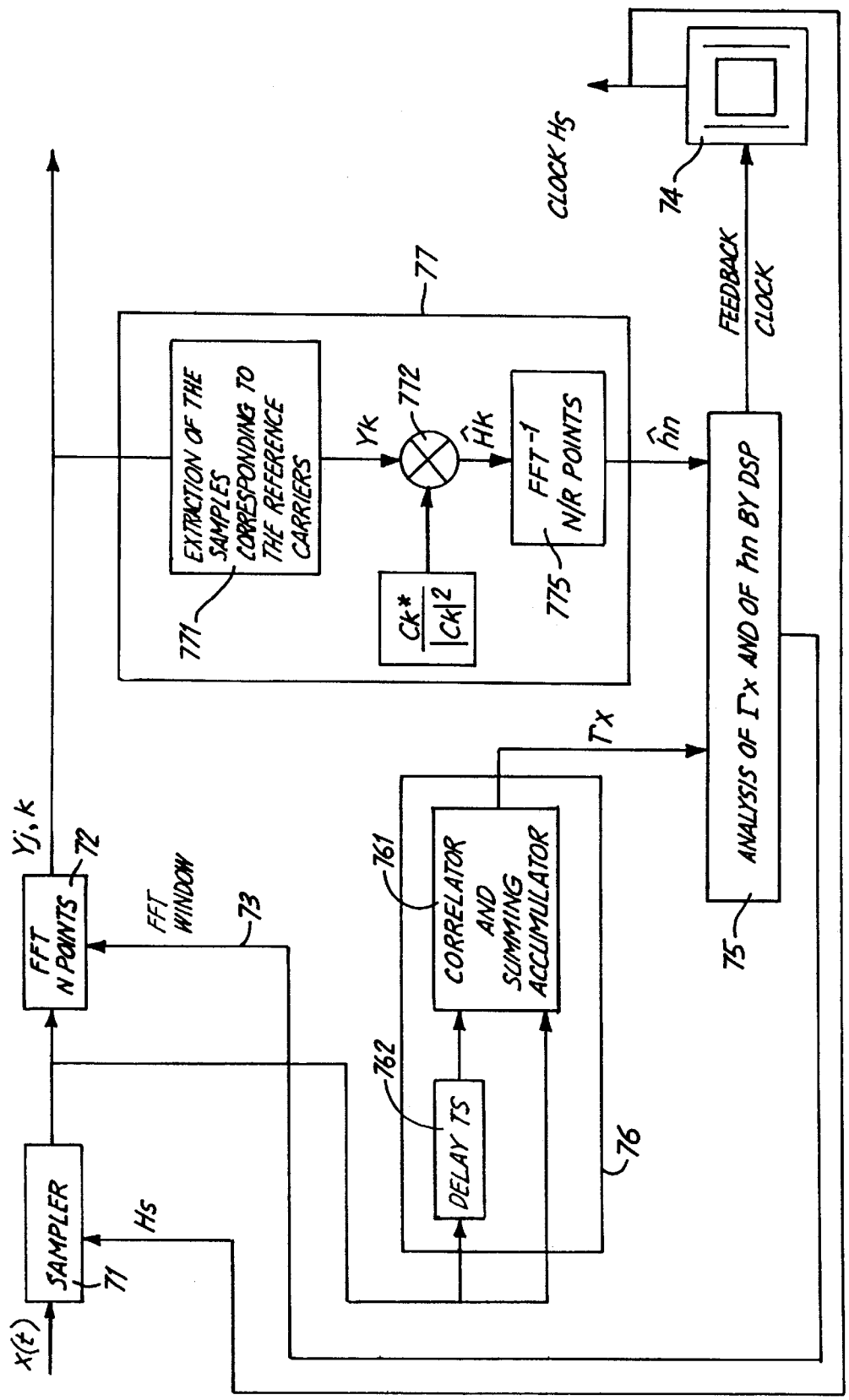
FIG. 7 is a block diagram of a device for the acquisition of the time synchronization according to the invention.

FIG. 7 is a simplified diagram of a device according to the invention implementing the different aspects discussed here above.

The received signal x(t) is sampled (71) at the frequency $H_s$ and then converted in the frequency space by means of an N-point FFT 72 to give the signal $Y_{j,k}=H_{j,k} \cdot C_{j,k}+N_{j,k}$ following the processing sequence.

The invention is aimed at accurately positioning the FFT window 73 in order to select the useful part of each symbol and achieve the feedback control of the clock $H_s$ 74 of the receiver.

For this purpose, the device has signal processing means 75 supplied firstly by means 76 to measure the correlation of the guard interval and secondly by means 77 to compute the estimation of the pulse response.

The means 76 for measuring the guard interval correlation comprise a correlator and summing accumulator 761 supplied firstly with the sample signal x(t) and secondly with the same signal x(t) delayed (762) by the duration $t_s$.

The means 77 for computing the estimation of the pulse response comprise means 771 for reconstructing a fictitious synchronization symbol by extraction and grouping the samples corresponding to reference carriers, providing a sub-sampled symbol $Y_k=H_k \cdot C_k+N_k$ (N/R samples). This fictitious symbol is standardized by multiplication 772 by $C^*_k/|C^2_k|$, then subjected to a reverse Fourier transform 773 on N/R points to give the estimation of the pulse response ĥ$_n$.

The processing means 75 then perform:

a rough synchronization by means of the measurement of correlation of the guard interval; and a fine synchronization by means of the estimation of the pulse response ĥ$_n$ according to the invention, in taking account of the measurement of correlation of the guard interval if necessary, as described here above.

What is claimed is:

1. Method for time synchronization of a receiver of a multicarrier signal consisting of a sequence of symbols each formed by a plurality of carrier frequencies each modulated by a modulation coefficient, and transmitted in a transmission channel;

certain of said carrier frequencies, with a position in time and in frequency that is known to said receiver, being reference carrier frequencies bearing a reference coefficient with a value known to said receiver, wherein said method comprises a fine synchronization phase comprising:

estimating a pulse response ĥ$_n$ of said transmission channel of said signal on the basis of reference coefficients belonging to at least two received symbols, so as to provide a fictitious synchronization symbol (non-transmitted), comprising the following steps:

extracting the reference coefficients belonging to M symbols comprising successive reference carriers, said reference carriers being separated by L useful carriers in one and the same symbol and being offset by R carriers between two symbols comprising successive reference carriers, with M and L greater than or equal to 2 and R=(L+1)/M;

grouping together said extracted reference coefficients so as to form a fictitious synchronization symbol, sub-sampled by a factor R; and calculating a reverse Fourier transform of said fictitious synchronization symbol so as to obtain an estimation of the pulse response $\hat{h}_n$ extending over a duration $t_s/R$, $t_s$ being a useful period of a symbol; and determining a beginning of a useful part of each of said symbols and/or a feedback control of a clock of the receiver, based on an analysis of said fictitious synchronization symbol.

2. The method according to claim 1, wherein the method further comprises:

implementing a rough synchronization phase in parallel to said fine synchronization phase;

correlating a guard interval, wherein correlating the guard interval comprises:

searching for a correlation peak between the contents of the guard interval preceding the useful part of each of said symbols and the end of the useful part of said symbol so as to determine a duration of said symbol.

3. The method according to claim 1, wherein analyzing said fictitious synchronization symbol comprises:

searching for a pulse representing a first path of the signal in the transmission channel;

analyzing said pulse representing the first path so as to determine if it is an echo or a pre-echo;

and wherein determining the beginning of the useful part of each of said symbols checks a position of a temporal selection window on the received signal, so as to position said pulse representing the first path substantially at the instant t=0 in said estimation of the pulse response $\hat{h}_n$, said window having to be delayed if it is an echo and advanced if it is a pre-echo.

4. The method according to claim 3, characterized in that a time range 0, $t_{max}$ on which estimating the pulse response $\hat{h}_n$ extends, comprises:

dividing the time range into two fields, a first field, called a field in advance, extending from the instant 0 to an instant $t_{lim}$, and a second field, called a delayed field, extending from the instant $t_{lim}$ to the instant $t_{max}$, said pulse representing the first path being considered to be an echo if it is in said field in advance and a pre-echo if it is in said delayed field.

5. The method according to claim 4, wherein dividing the time range comprises:

using the instant $t_{lim}$ to divide the time range, characterized in that $t_{lim}$ is greater than or equal to a duration $\Delta$ of a guard interval preceding the useful part of each of said symbols.

6. The method according to claim 1, wherein the method further comprises:

implementing a rough synchronization phase in parallel to said fine synchronization phase;

correlating a guard interval, wherein correlating the guard interval comprises:

searching for a correlation peak between the contents of the guard interval preceding the useful part of each of said symbols and the end of the useful part of said symbol so as to determine a duration of said symbol.

7. The method according to claim 6, characterized in that it comprises:

distinguishing between a long echo and a pre-echo, when said pulse representing the first path is in said delayed field, by analysis of a measurement of a correlation of a guard interval, consisting in determining a number of samples of said measurement of the correlation greater than a decision threshold, said pulse representing a first path being considered to be a long echo when said number of samples is greater than a predetermined value.

8. A device for time synchronization of a receiver of a multicarrier signal consisting of a sequence of symbols each formed by a plurality of carrier frequencies each modulated by a modulation coefficient, certain of said carrier frequencies, with a position in a time-frequency space that is known to said receiver, being reference carrier frequencies bearing a reference coefficient with a value known to said receiver, characterized in that said device comprises fine synchronization means comprising:

means for estimating a pulse response $\hat{h}_n$ of a transmission channel of said signal on the basis of reference coefficients belonging to at least two received symbols, so as to provide a fictitious synchronization symbol (non-transmitted), the means comprising;

means for extracting the reference coefficients belonging to M symbols comprising successive reference carriers, said reference carriers being separated by L useful carriers in one and the same symbol and being offset by R carriers between two symbols comprising successive reference carriers, with M and L greater than or equal to 2 and R=(L+1)/M;

means for grouping together said extracted reference coefficients so as to form a fictitious synchronization symbol, sub-sampled by a factor R; and means for calculating a reverse Fourier transform of said fictitious synchronization symbol so as to obtain an estimation of the pulse response $\hat{h}_n$ extending over a duration $t_s/R$, $t_s$ being a useful period of a symbol; and means to determine a beginning of a useful part of each of said symbols, by analysis of said estimation of the pulse response $\hat{h}_n$.

9. Method for time synchronization of a receiver of a multicarrier signal consisting of a sequence of symbols each formed by a plurality of carrier frequencies each modulated by a modulation coefficient, and transmitted in a transmission channel;

certain of said carrier frequencies, with a position in time and in frequency that is known to said receiver, being reference carrier frequencies bearing a reference coefficient with a value known to said receiver, wherein said method comprises a fine synchronization phase comprising:

estimating a pulse response $\hat{h}_n$ of said transmission channel of said signal on the basis of reference coefficients belonging to at least two received symbols, so as to provide a fictitious synchronization symbol (non-transmitted); and determining a beginning of a useful part of each of said symbols and/or a feedback control of a clock of the receiver, based on an analysis of said fictitious synchronization symbol, comprising the following steps:

searching for a pulse representing a first path of the signal in the transmission channel;

analyzing said pulse representing the first path so as to determine if it is an echo or a pre-echo;

and wherein determining the beginning of the useful part of each of said symbols checks a position of a temporal selection window on the received signal, so as to position said pulse representing the first path substantially at the instant t=0 in said estimation of the pulse response $\hat{h}_n$, said window having to be delayed if it is an echo and advanced if it is a pre-echo.

10. The method according to claim 9, wherein estimating a pulse response $\hat{h}_n$ comprises:

extracting the reference coefficients belonging to M symbols comprising successive reference carriers, said reference carriers being separated by L useful carriers in one and the same symbol and being offset by R carriers between two symbols comprising successive reference carriers, with M and L greater than or equal to 2 and R=(L+1)/M;

grouping together said extracted reference coefficients so as to form a fictitious synchronization symbol, sub-sampled by a factor R;

calculating a reverse Fourier transform of said fictitious synchronization symbol so as to obtain an estimation of the pulse response $\hat{h}_n$ extending over a duration $t_s/R$, $t_s$ being a useful period of a symbol.

11. The method according to claim 9, characterized in that a time range 0, $t_{max}$ on which estimating the pulse response $\hat{h}_n$ extends, comprises:

dividing the time range into two fields, a first field, called a field in advance, extending from the instant 0 to an instant $t_{lim}$, and a second field, called a delayed field, extending from the instant $t_{lim}$ to the instant $t_{max}$, said pulse representing the first path being considered to be an echo if it is in said field in advance and a pre-echo if it is in said delayed field.

12. The method according to claim 11, wherein dividing the time range comprises:

using the instant $t_{lim}$ to divide the time range, characterized in that $t_{lim}$ is greater than or equal to a duration Δ of a guard interval preceding the useful part of each of said symbols.

13. The method according to claim 12, comprises, wherein the method further comprises:

implementing a rough synchronization phase in parallel to said fine synchronization phase, correlating a guard interval, wherein correlating the guard interval comprises:

searching for a correlation peak between the contents of the guard interval preceding the useful part of each of said symbols and the end of the useful part of said symbol so as to determine a duration of said symbol.

14. The method according to claim 13, characterized in that it comprises:

distinguishing between a long echo and a pre-echo, when said pulse representing the first path is in said delayed field, by analysis of a measurement of a correlation of a guard interval, consisting in determining a number of samples of said measurement of the correlation greater than a decision threshold, said pulse representing a first path being considered to be a long echo when said number of samples is greater than a predetermined value.

15. The method according to claim 11, characterized in that it comprises:

distinguishing between a long echo and a pre-echo, when said pulse representing the first path is in said delayed field, by analysis of a measurement of a correlation of a guard interval, consisting in determining a number of samples of said measurement of the correlation greater than a decision threshold, said pulse representing a first path being considered to be a long echo when said number of samples is greater than a predetermined value.

16. The method according to claim 15, wherein distinguishing between a long echo and a pre-echo comprises:

selecting two amplitudes corresponding to a highest pulse of each of said fields, said decision threshold is substantially proportional to a smallest amplitude of the two amplitudes corresponding to the highest pulse of each of said fields that are 'in advance' or 'delayed'.

17. The method according to claim 11, wherein the method further comprises:

implementing a rough synchronization phase in parallel to said fine synchronization phase;

correlating a guard interval, wherein correlating the guard interval comprises:

searching for a correlation peak between the contents of the guard interval preceding the useful part of each of said symbols and the end of the useful part of said symbol so as to determine a duration of said symbol.

18. The method according to claim 17, characterized in that it comprises:

distinguishing between a long echo and a pre-echo, when said pulse representing the first path is in said delayed field, by analysis of a measurement of a correlation of a guard interval, consisting in determining a number of samples of said measurement of the correlation greater than a decision threshold, said pulse representing a first path being considered to be a long echo when said number of samples is greater than a predetermined value.

19. The method according to claim 9, wherein the method further comprises:

implementing a rough synchronization phase in parallel to said fine synchronization phase correlating a guard interval, wherein correlating the guard interval comprises:

searching for a correlation peak between the contents of the guard interval preceding the useful part of each of said symbols and the end of the useful part of said symbol so as to determine a duration of said symbol.

20. The method according to claim 19, characterized in that it comprises:

distinguishing between a long echo and a pre-echo, when said pulse representing the first path is in said delayed field, by analysis of a measurement of a correlation of a guard interval, consisting in determining a number of samples of said measurement of the correlation greater than a decision threshold, said pulse representing a first path being considered to be a long echo when said number of samples is greater than a predetermined value.

* * * * *

UNITED STATES PATENT AND TRADEMARK OFFICE
CERTIFICATE OF CORRECTION

PATENT NO. : 6,459,744 B1
DATED : October 1, 2002
INVENTOR(S) : Jean-Francois Helard et al.

It is certified that error appears in the above-identified patent and that said Letters Patent is hereby corrected as shown below:

<u>Column 13,</u>
Line 39, after "claim 12", delete "comprises,"

Signed and Sealed this

Eleventh Day of November, 2003

JAMES E. ROGAN
*Director of the United States Patent and Trademark Office*